(12) United States Patent
Fujiwara et al.

(10) Patent No.: US 9,722,688 B2
(45) Date of Patent: Aug. 1, 2017

(54) WIRELESS TRANSPORT SYSTEM

(71) Applicant: Hitachi, Ltd., Chiyoda-ku, Tokyo (JP)

(72) Inventors: Ryosuke Fujiwara, Tokyo (JP);
Makoto Katagishi, Tokyo (JP);
Masayuki Miyazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 71 days.

(21) Appl. No.: 14/771,822

(22) PCT Filed: Mar. 8, 2013

(86) PCT No.: PCT/JP2013/056383
§ 371 (c)(1),
(2) Date: Sep. 1, 2015

(87) PCT Pub. No.: WO2014/136249
PCT Pub. Date: Sep. 12, 2014

(65) Prior Publication Data
US 2016/0028467 A1    Jan. 28, 2016

(51) Int. Cl.
*H04B 7/14* (2006.01)
*H04L 12/741* (2013.01)
(Continued)

(52) U.S. Cl.
CPC ............. *H04B 7/14* (2013.01); *H04L 45/745* (2013.01); *H04W 28/20* (2013.01); *H04W 74/06* (2013.01); *H04B 7/155* (2013.01); *H04B 7/2656* (2013.01); *H04L 45/021* (2013.01); *H04W 72/0446* (2013.01); *H04W 84/18* (2013.01); *H04W 88/02* (2013.01); *H04W 88/08* (2013.01)

(58) Field of Classification Search
CPC ......... H04W 88/04; H04W 28/20; H04B 7/15
See application file for complete search history.

(56) References Cited

U.S. PATENT DOCUMENTS

| 6,934,554 B2 | 8/2005 | Mizuno et al. |
| 2009/0022101 A1* | 1/2009 | Min ...................... H04W 48/08 370/329 |

(Continued)

FOREIGN PATENT DOCUMENTS

| JP | 2002-325273 A | 11/2002 |
| JP | 2010-178347 A | 8/2010 |

(Continued)

OTHER PUBLICATIONS

International Search Report (PCT/ISA/210) dated May 28, 2013 with English-language translation (two (2) pages).

*Primary Examiner* — Shaq Taha
(74) *Attorney, Agent, or Firm* — Crowell & Moring LLP

(57) ABSTRACT

An object of the disclosed invention is to provide a polling-based multihop communication system capable of achieving robust communication. Solving means thereof is a (multihop communication) wireless transmission system including, as wireless stations, a base station, a plurality of relay stations connected at multiple stages by using the base station as a root, and a plurality of terminals connected to the relay stations, in which the base station and the relay stations perform communication using polling in one or more service periods which have been allocated to each of the base and relay stations in time division in advance in a system cycle.

15 Claims, 22 Drawing Sheets

POLLING OPERATION EXAMPLE IN SERVICE PERIOD

(51) Int. Cl.
*H04W 28/20* (2009.01)
*H04W 74/06* (2009.01)
*H04W 84/18* (2009.01)
*H04B 7/26* (2006.01)
*H04W 72/04* (2009.01)
*H04W 88/02* (2009.01)
*H04W 88/08* (2009.01)
*H04L 12/755* (2013.01)
*H04B 7/155* (2006.01)

(56) References Cited

U.S. PATENT DOCUMENTS

| | | | | |
|---|---|---|---|---|
| 2010/0027457 | A1* | 2/2010 | Okuda | H04B 7/155 |
| | | | | 370/315 |
| 2012/0195252 | A1* | 8/2012 | Suga | H04B 7/15528 |
| | | | | 370/315 |
| 2012/0263137 | A1 | 10/2012 | Walton et al. | |
| 2014/0376527 | A1* | 12/2014 | Takatsuka | H04W 74/02 |
| | | | | 370/337 |

FOREIGN PATENT DOCUMENTS

| | | |
|---|---|---|
| JP | 2010-226324 A | 10/2010 |
| JP | 2012-23631 A | 2/2012 |
| JP | 2012-124664 A | 6/2012 |

\* cited by examiner

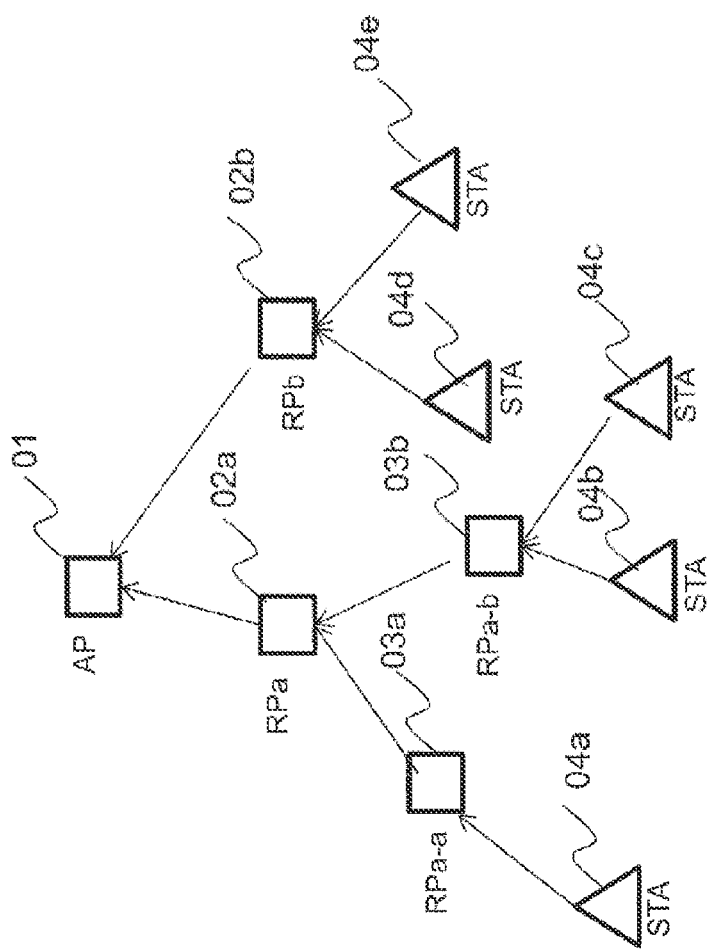
Fig. 1 NETWORK CONFIGURATION EXAMPLE IN EXAMPLE 1

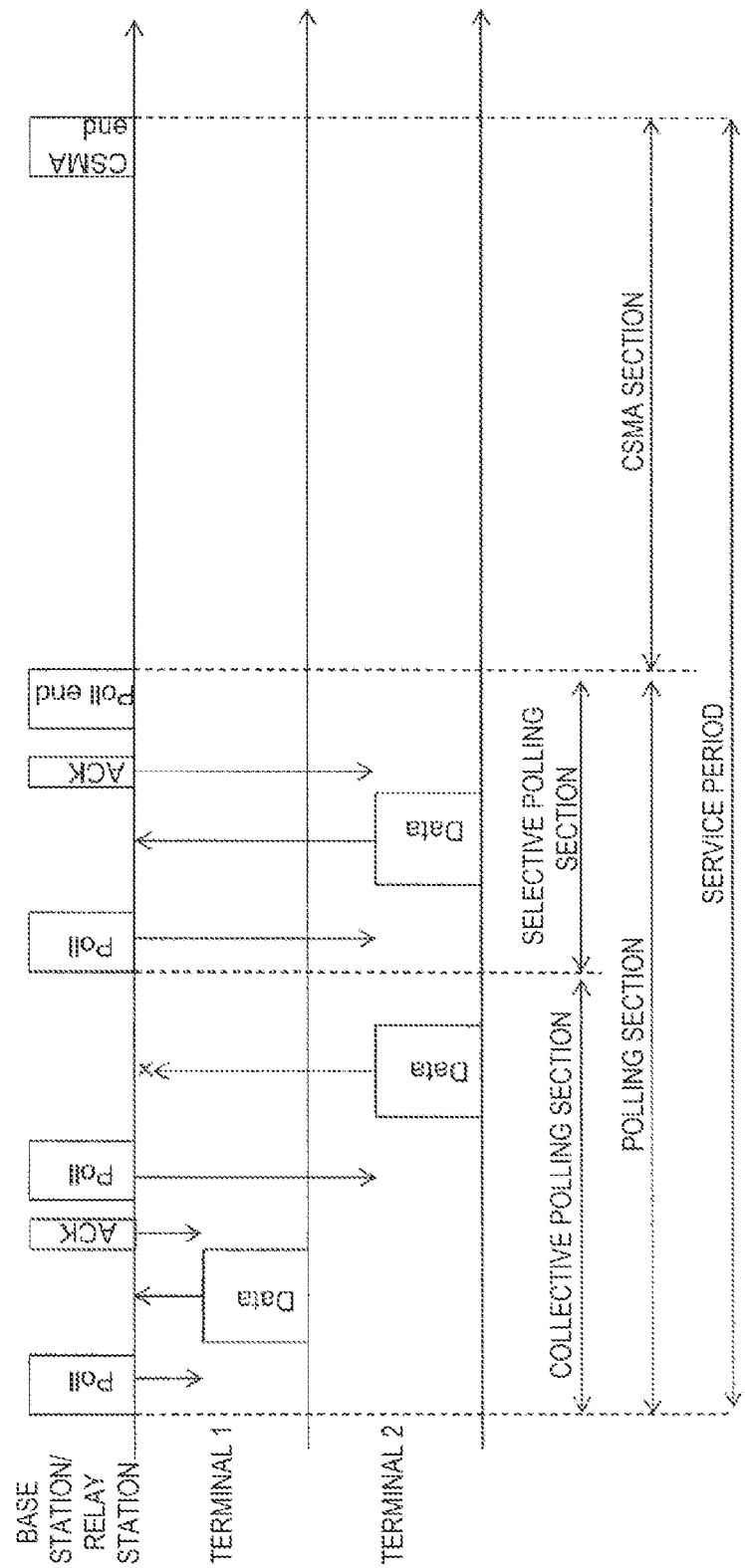
Fig. 2 POLLING OPERATION EXAMPLE IN SERVICE PERIOD

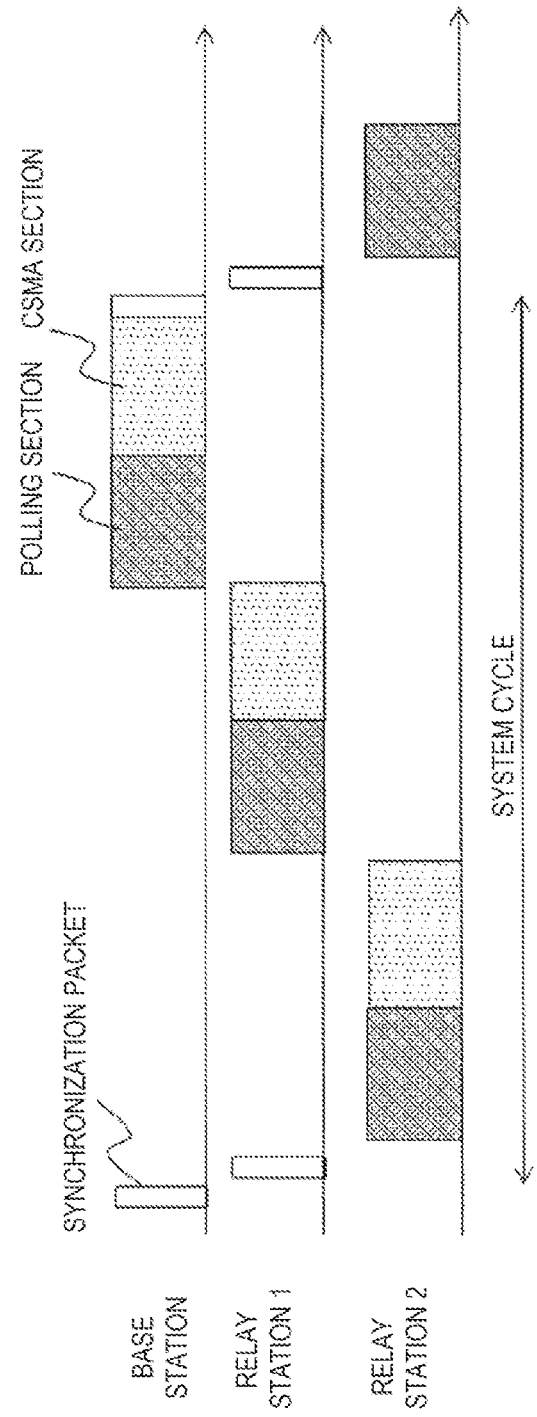
Fig. 3 TIME CHART SHOWING FIRST POLLING TIMING EXAMPLE IN EXAMPLE 1

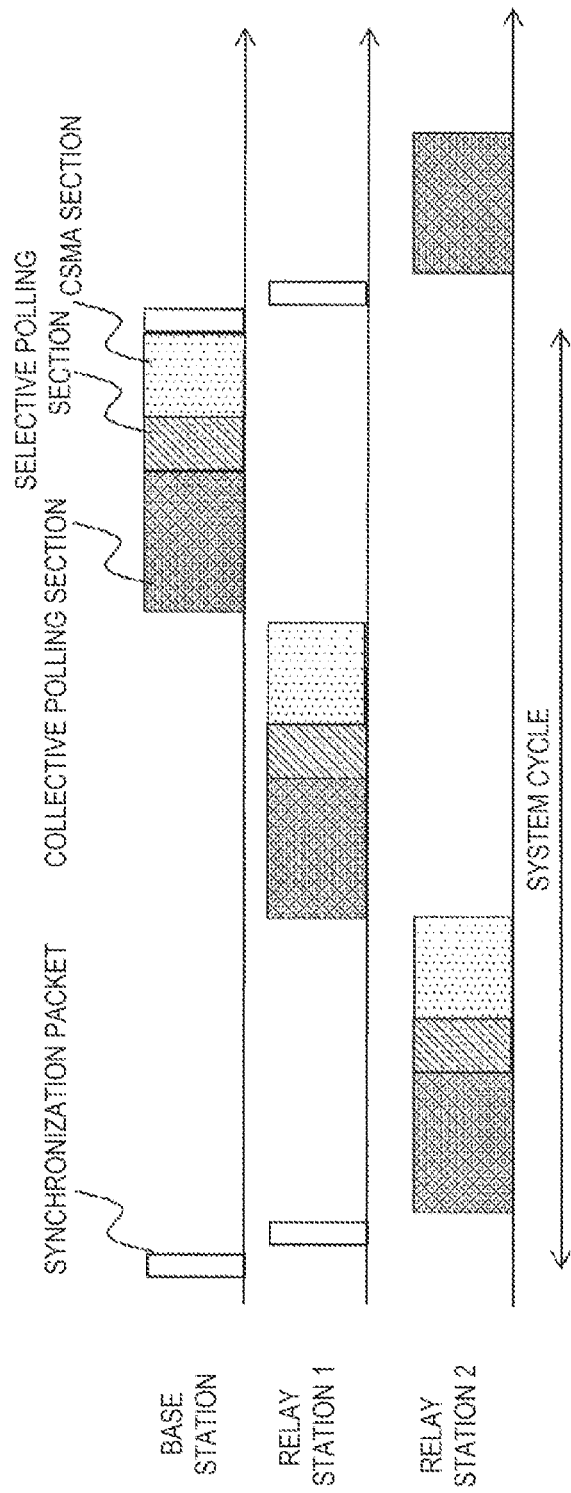

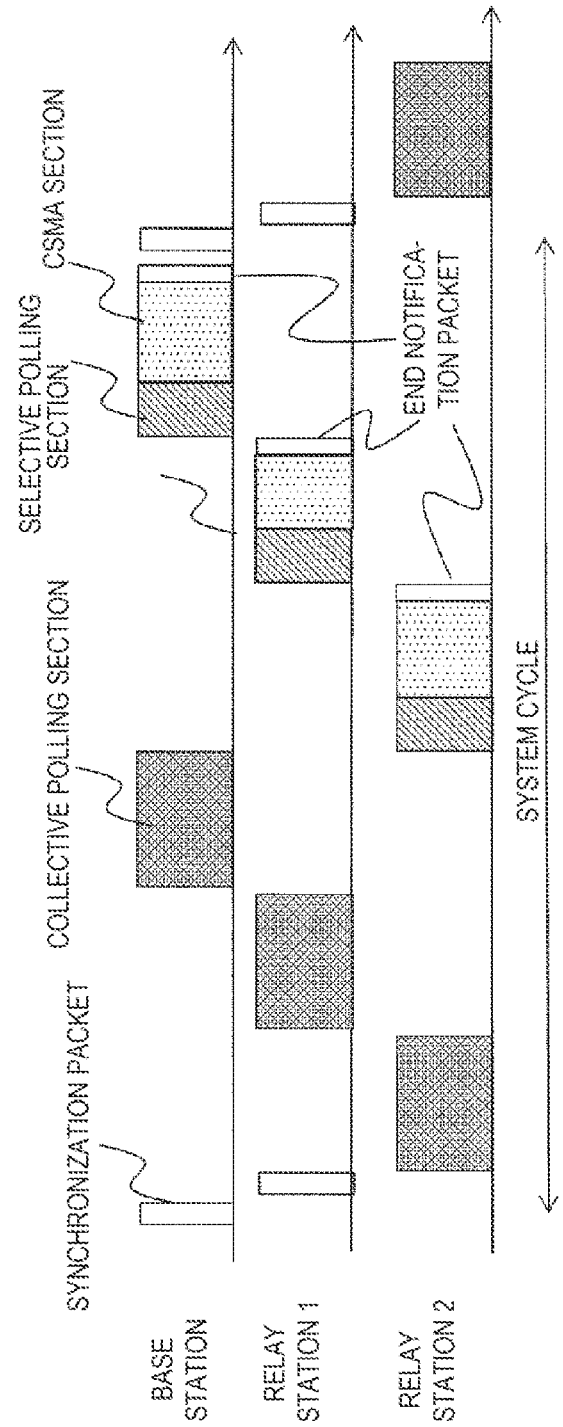
Fig. 5 TIME CHART SHOWING THIRD POLLING TIMING EXAMPLE IN EXAMPLE 1

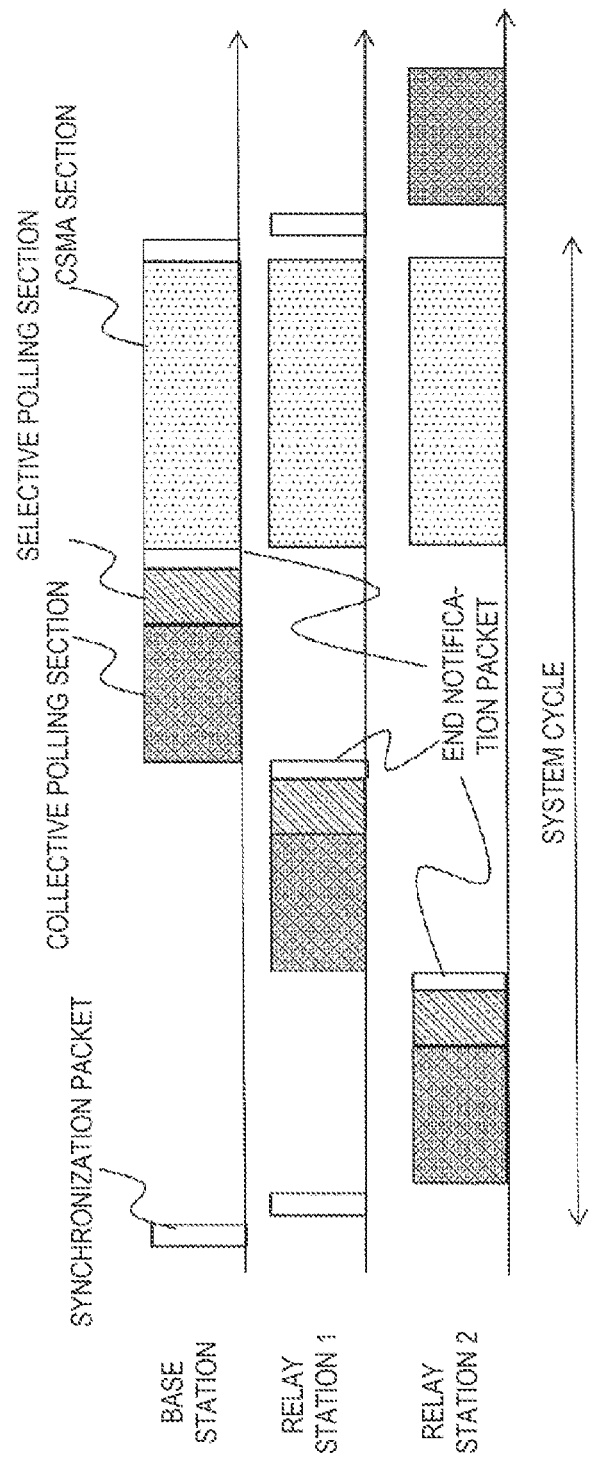
Fig. 6 TIME CHART SHOWING FOURTH POLLING TIMING EXAMPLE IN EXAMPLE 1

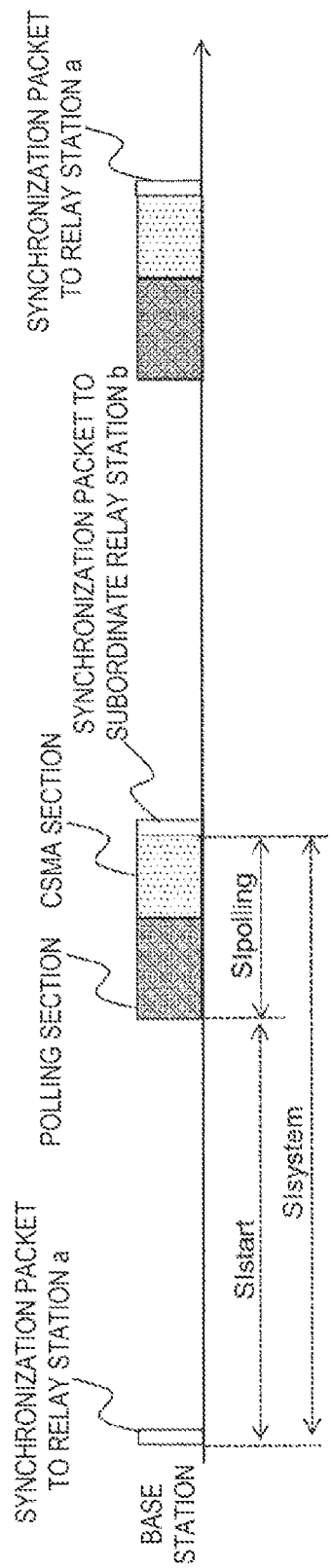
Fig. 7 TIMING CHART SHOWING OPERATION EXAMPLE OF BASE STATION IN FIRST POLLING TIMING EXAMPLE IN EXAMPLE 1

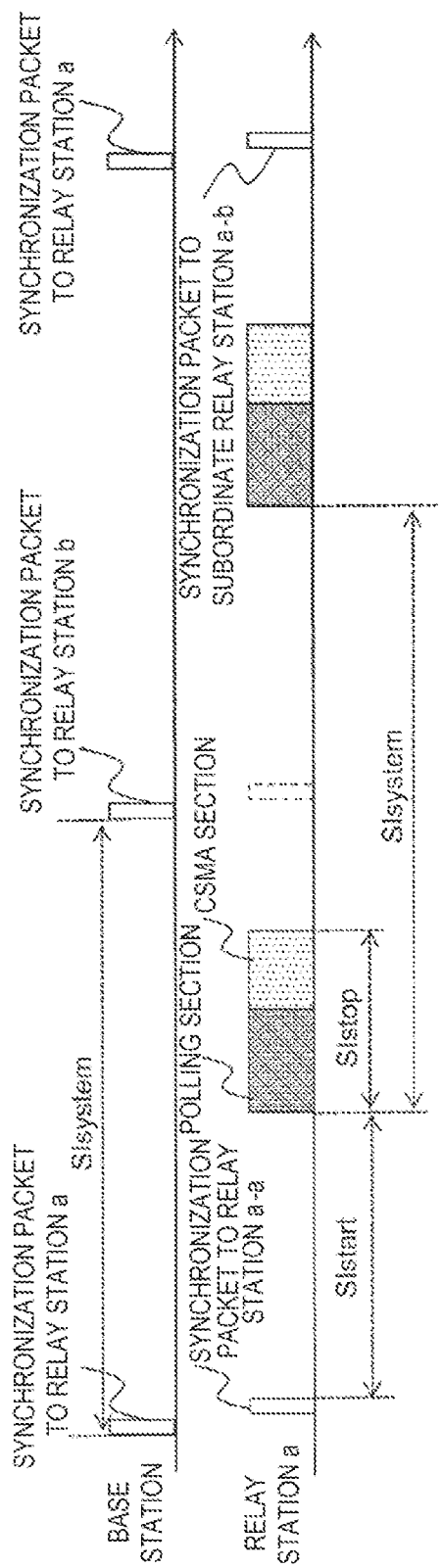
Fig. 8 TIMING CHART SHOWING OPERATION EXAMPLE OF RELAY STATION IN FIRST POLLING TIMING EXAMPLE IN EXAMPLE 1

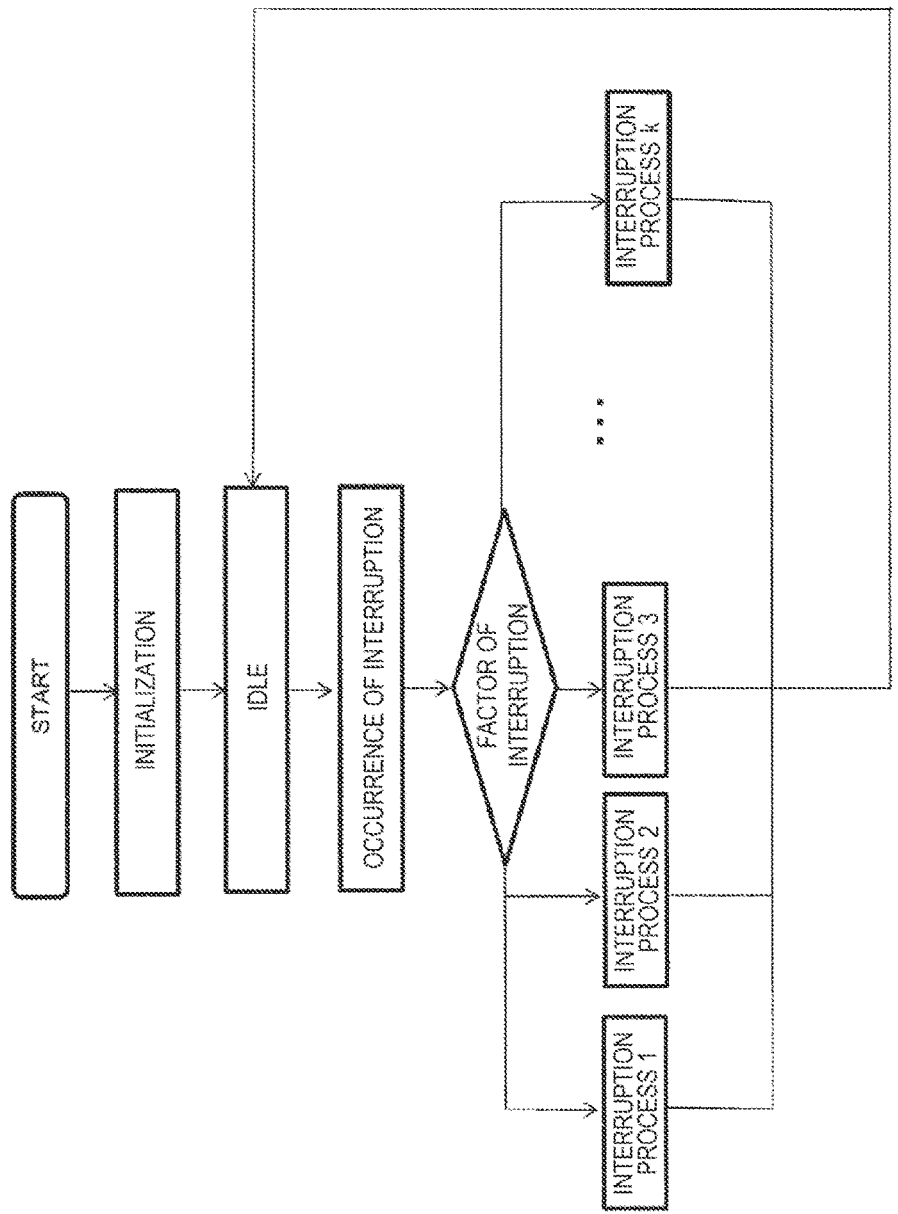
[FIG. 9A]

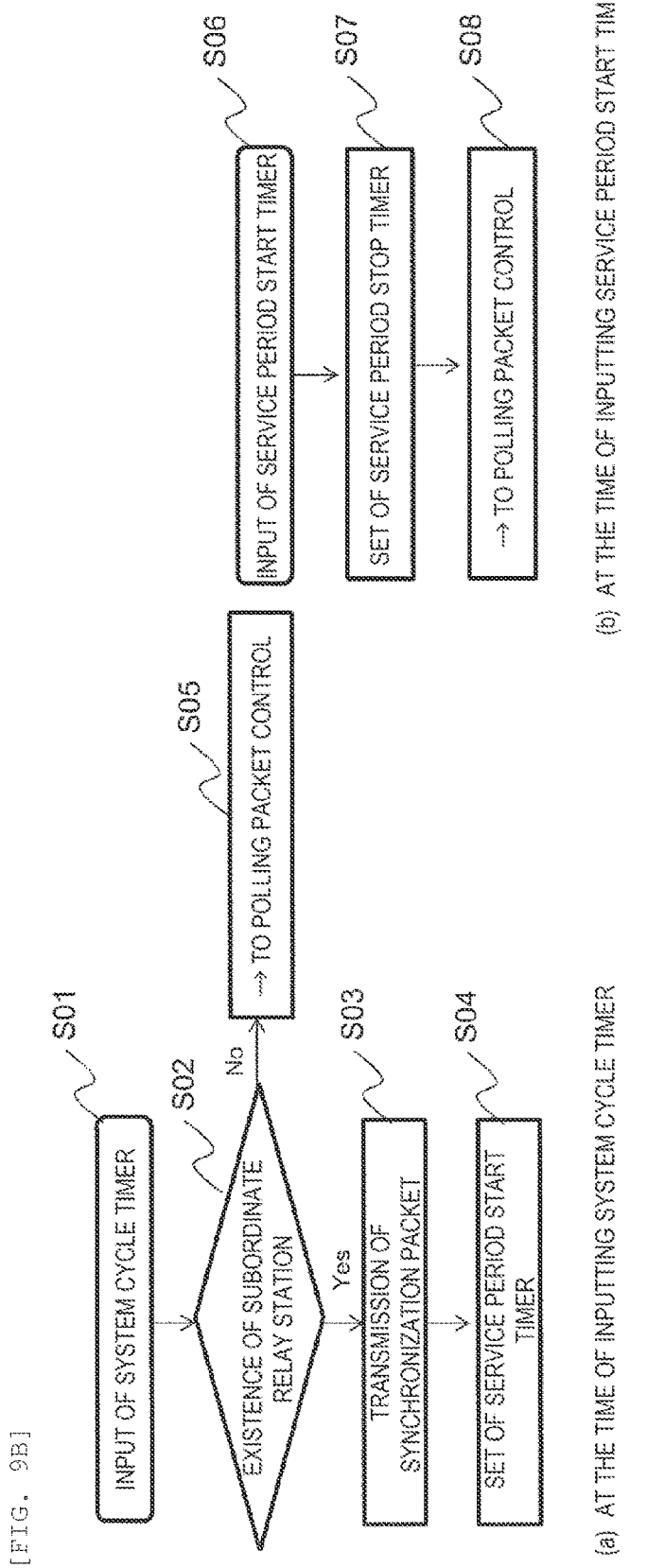

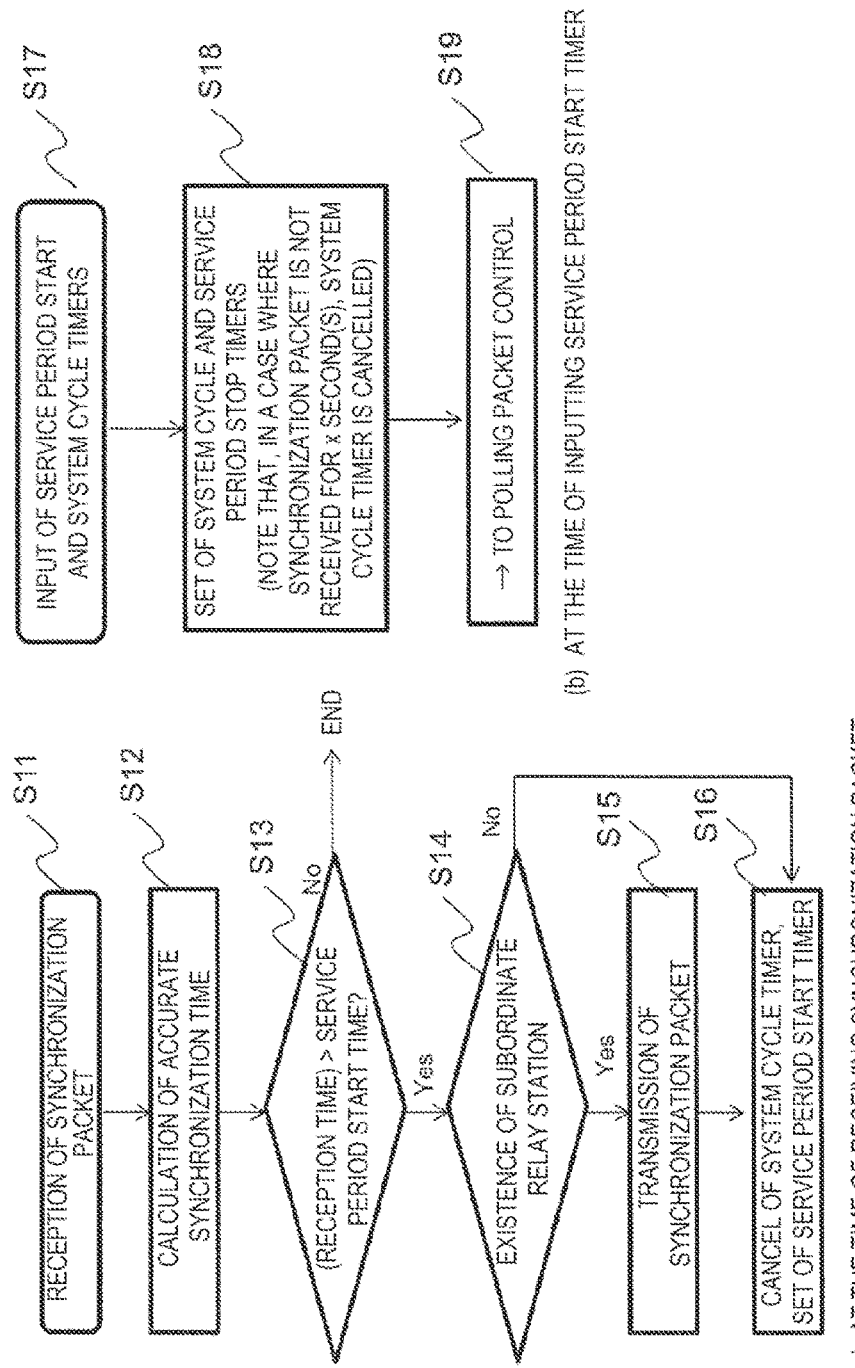
Fig. 10 FLOWCHART SHOWING OPERATION OF RELAY STATION IN EXAMPLE 1

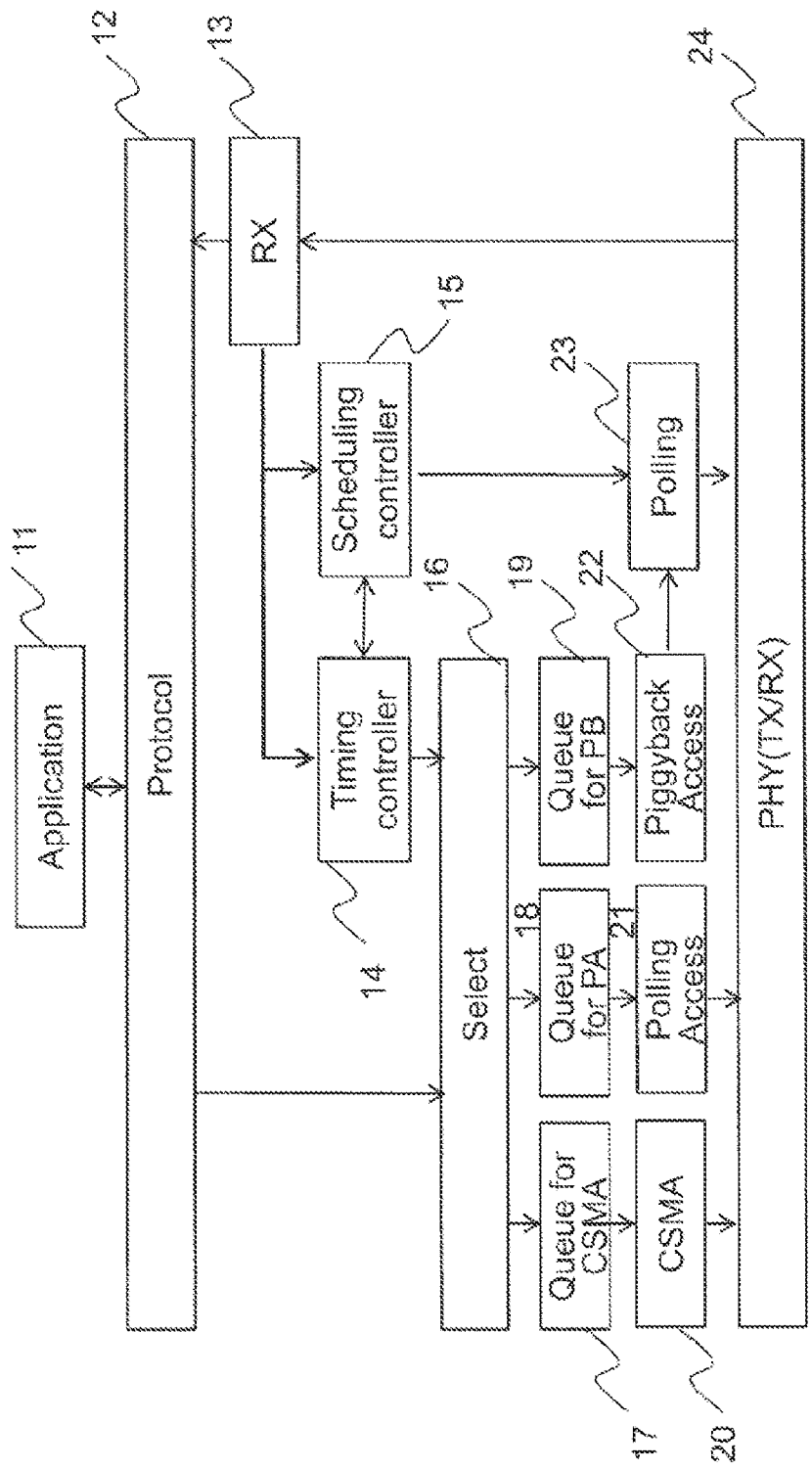
Fig. 11 BLOCK DIAGRAM SHOWING CONFIGURATION EXAMPLE OF BASE STATION/RELAY STATION IN EXAMPLE 1

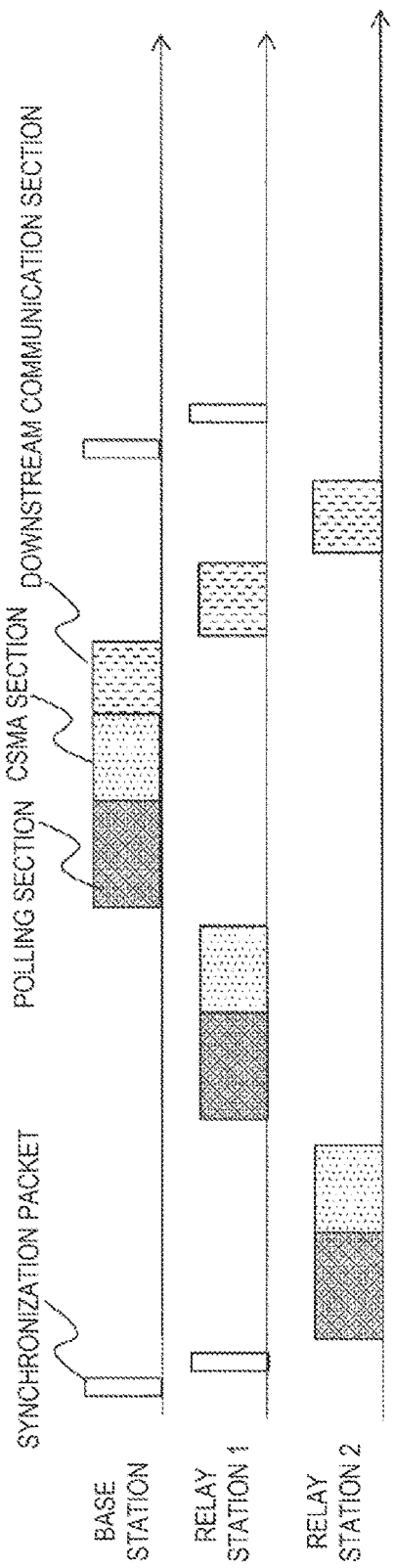
Fig. 12 TIME CHART SHOWING FIFTH POLLING TIMING EXAMPLE IN EXAMPLE 1

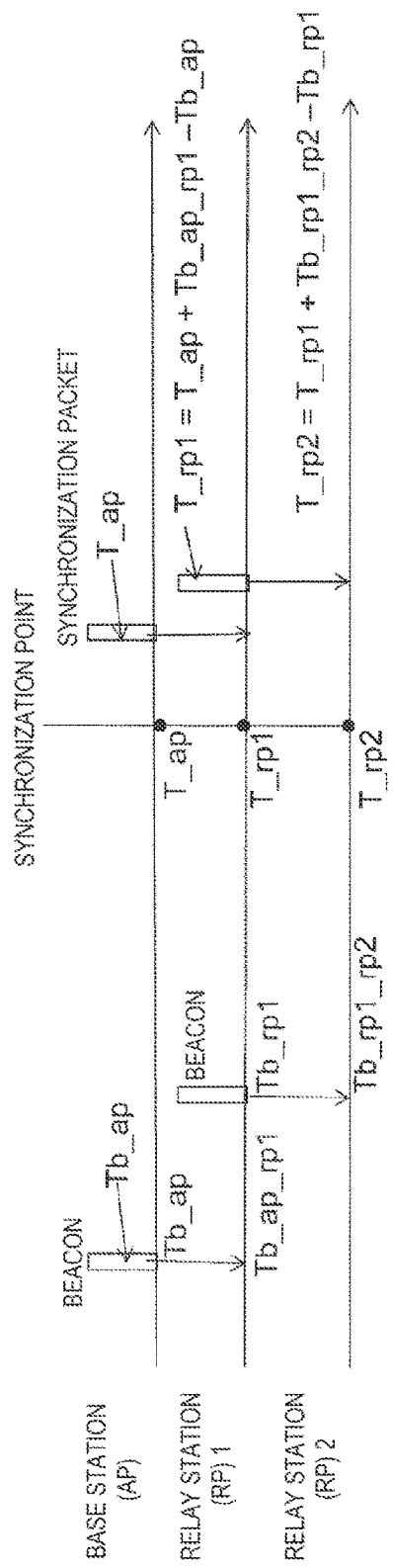
Fig. 13 TIME CHART SHOWING HOW TO DEAL WITH CASE WHERE TRANSMISSION OF SYNCHRONIZATION PACKET IS DELAYED WHEN INTERFERENCE EXISTS

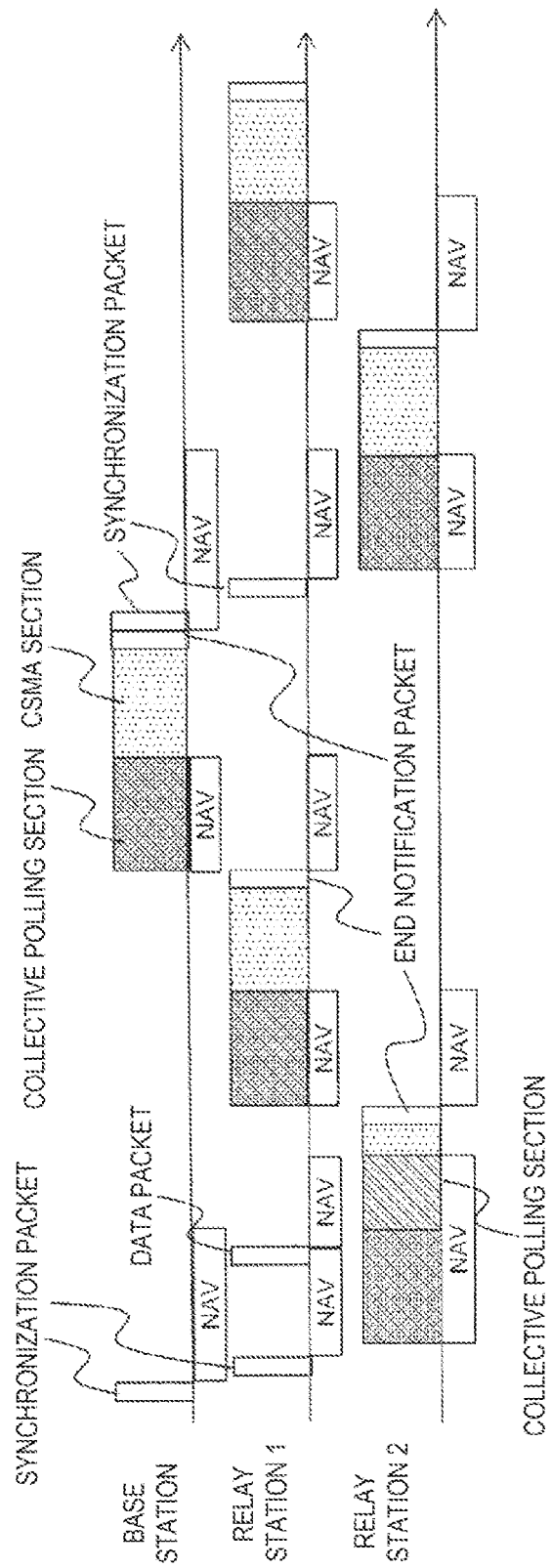
Fig. 14 COUNTERMEASURE FOR INTERFERENCE USING PROHIBITION OF TRANSMISSION

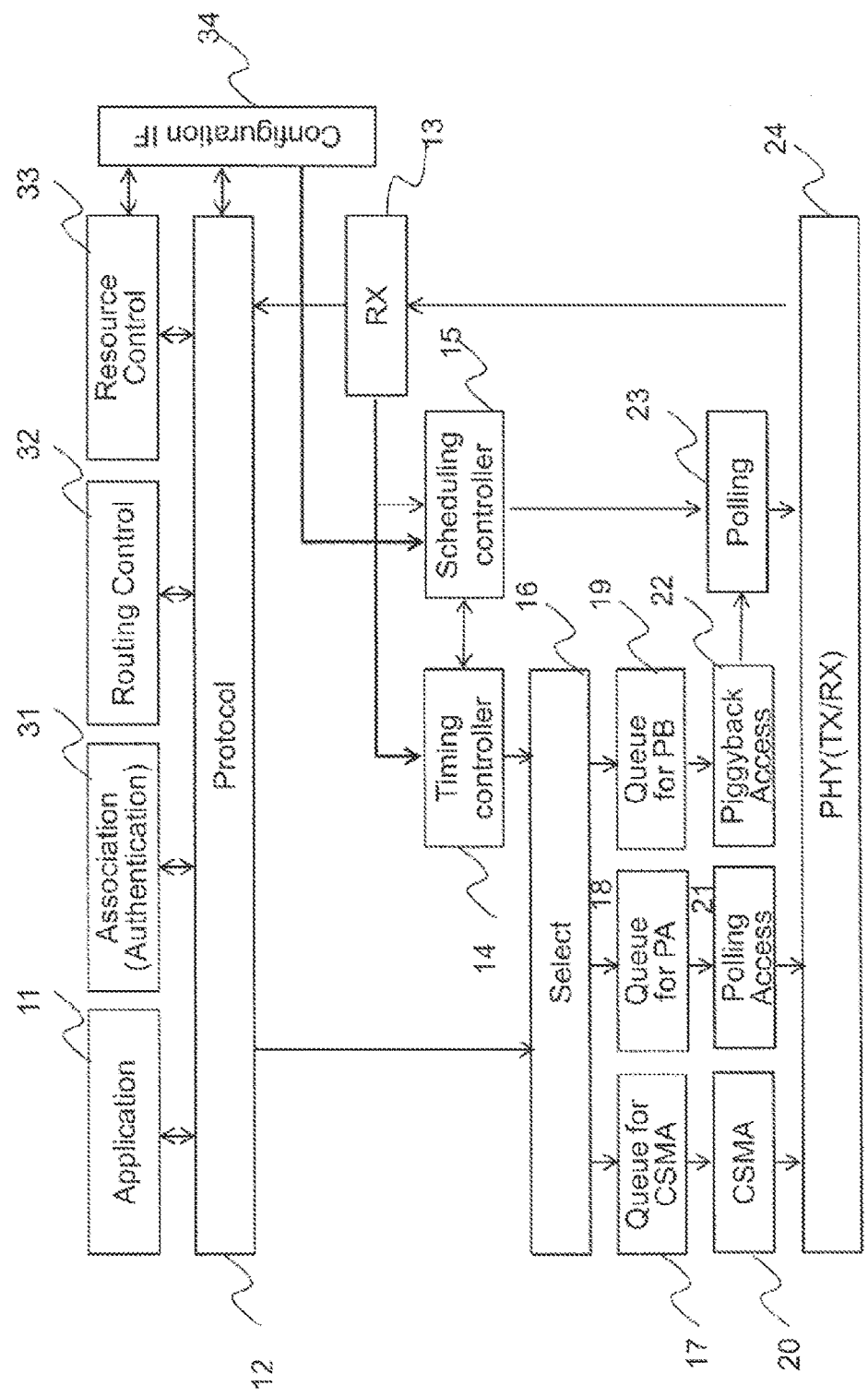
Fig. 15 BLOCK DIAGRAM SHOWING CONFIGURATION EXAMPLE OF BASE STATION IN EMBODIMENT 2

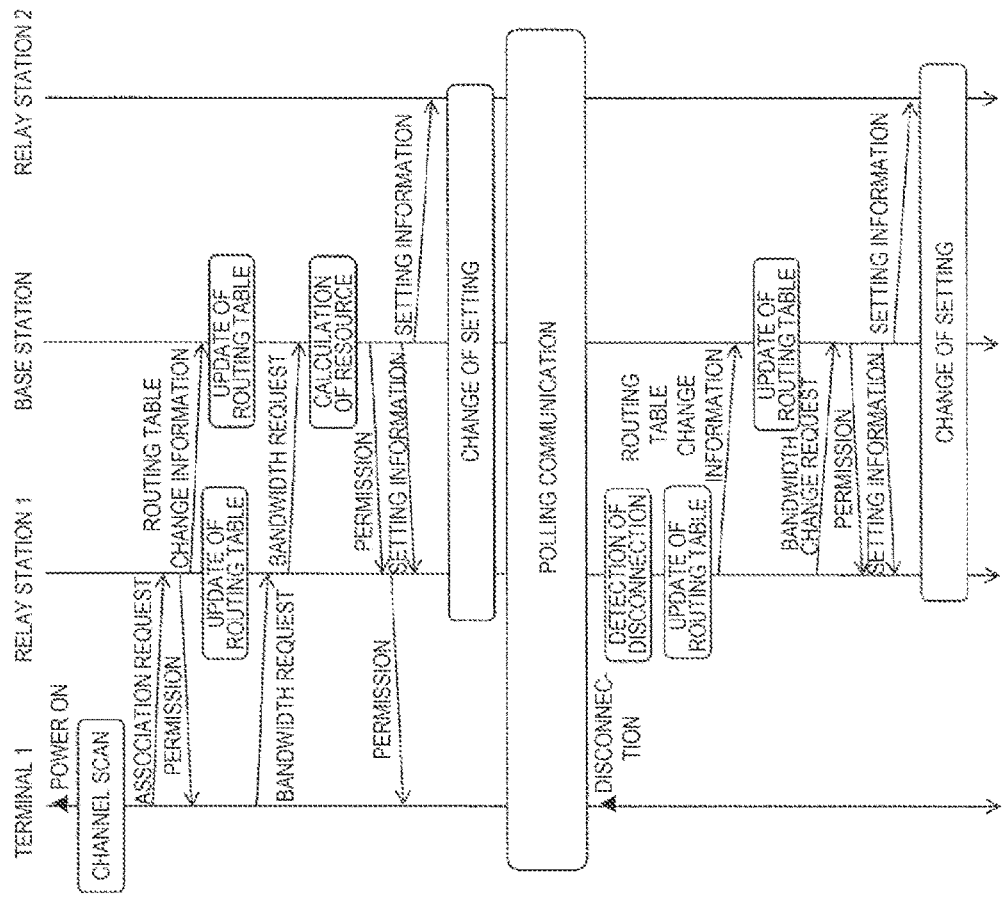
Fig. 16 TIME SEQUENCE EXAMPLE PERFORMED AT THE TIME OF ADDITION/DISCONNECTION OF TERMINAL

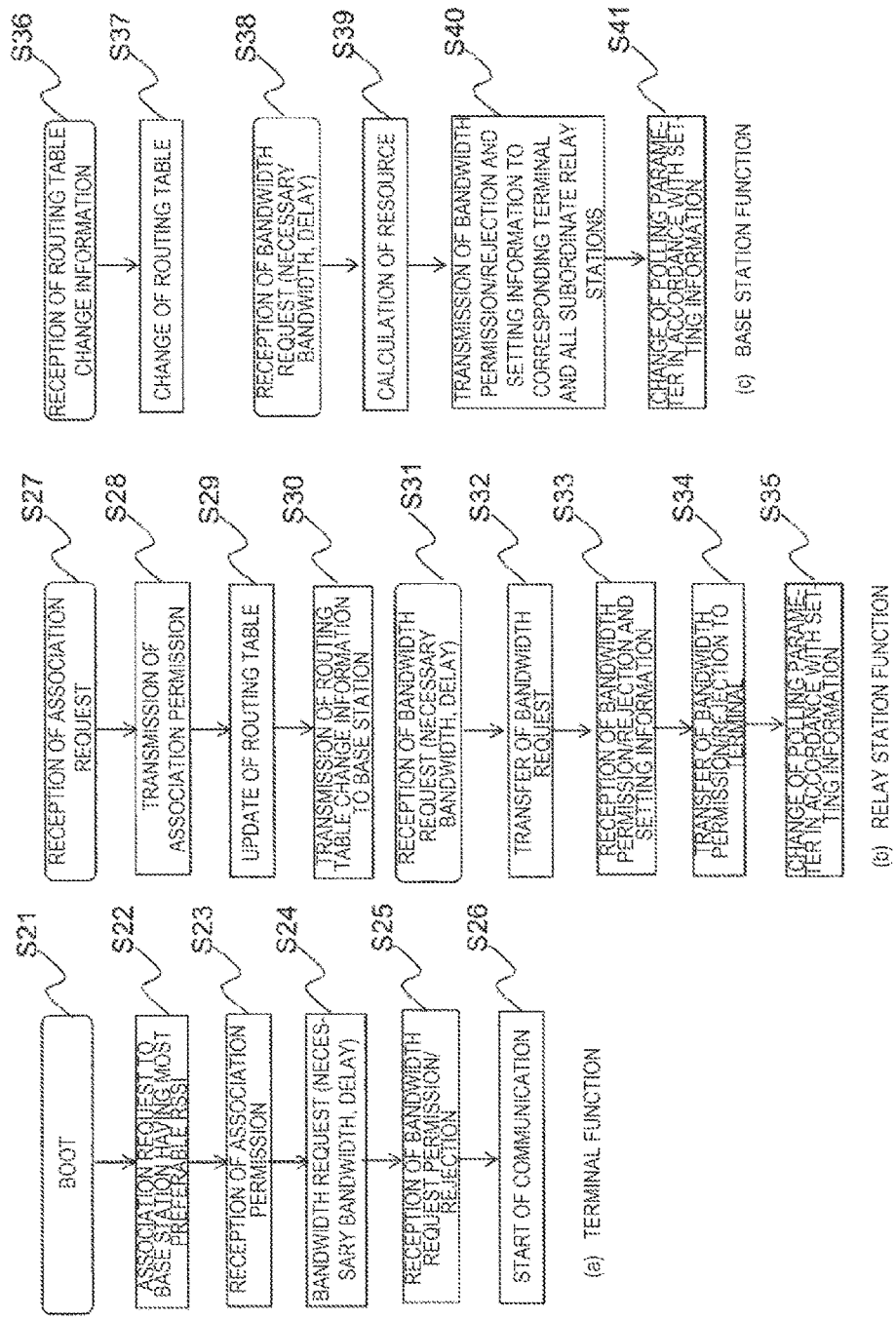
FIG. 17 FLOWCHART SHOWING OPERATION EXAMPLE PERFORMED AT THE TIME OF ADDITION OF TERMINAL

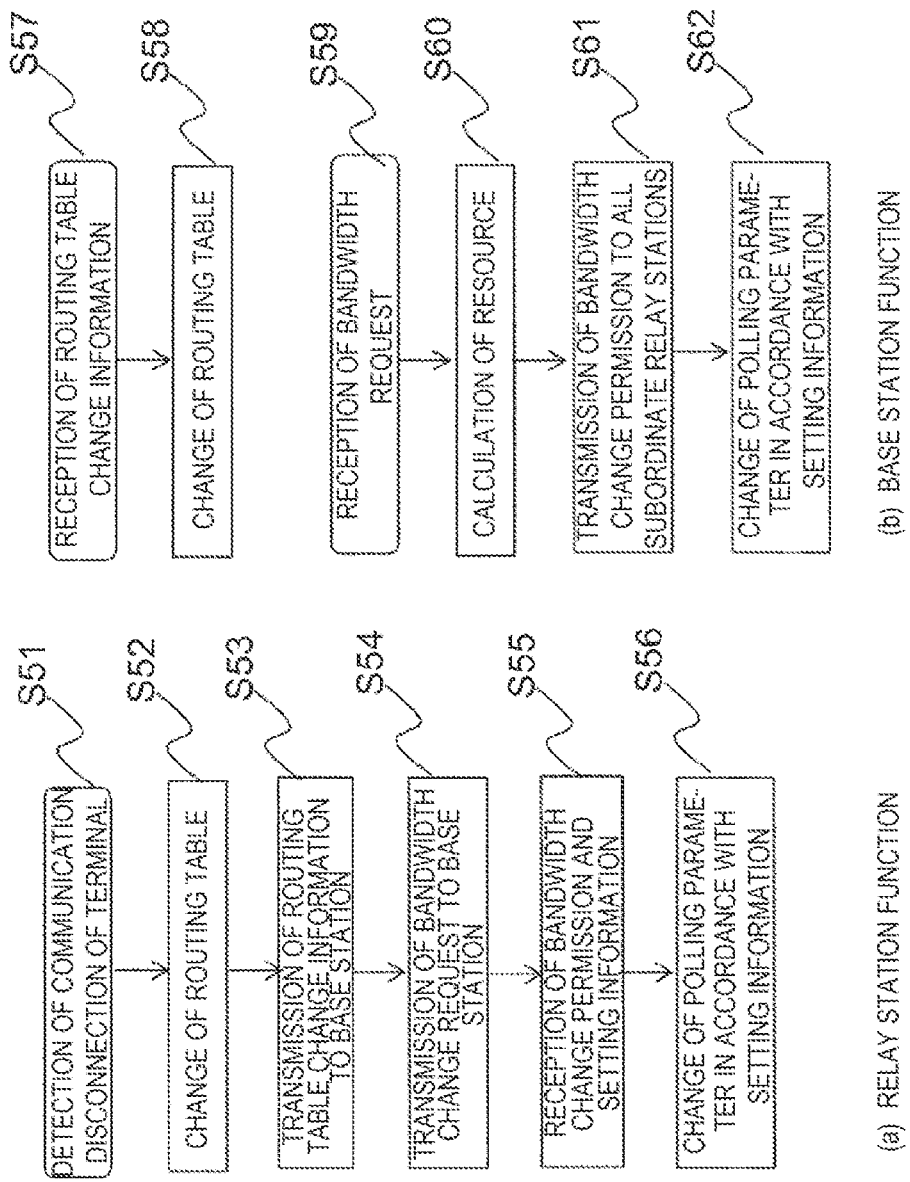
Fig. 18 FLOWCHART SHOWING OPERATION EXAMPLE PERFORMED AT THE TIME OF REMOVAL OF TERMINAL FROM NETWORK

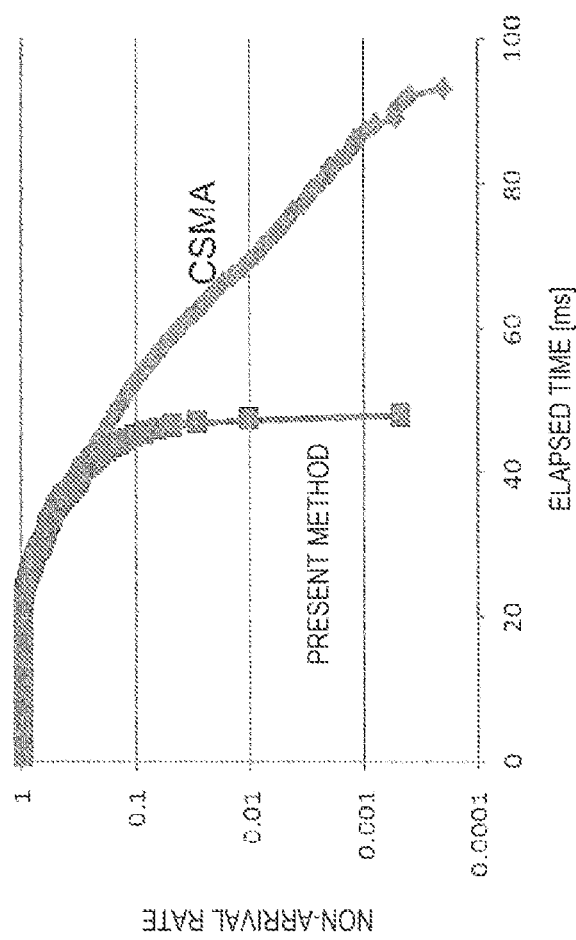
Fig. 19 SIMULATION RESULTS INDICATING DELAY CHARACTERISTICS

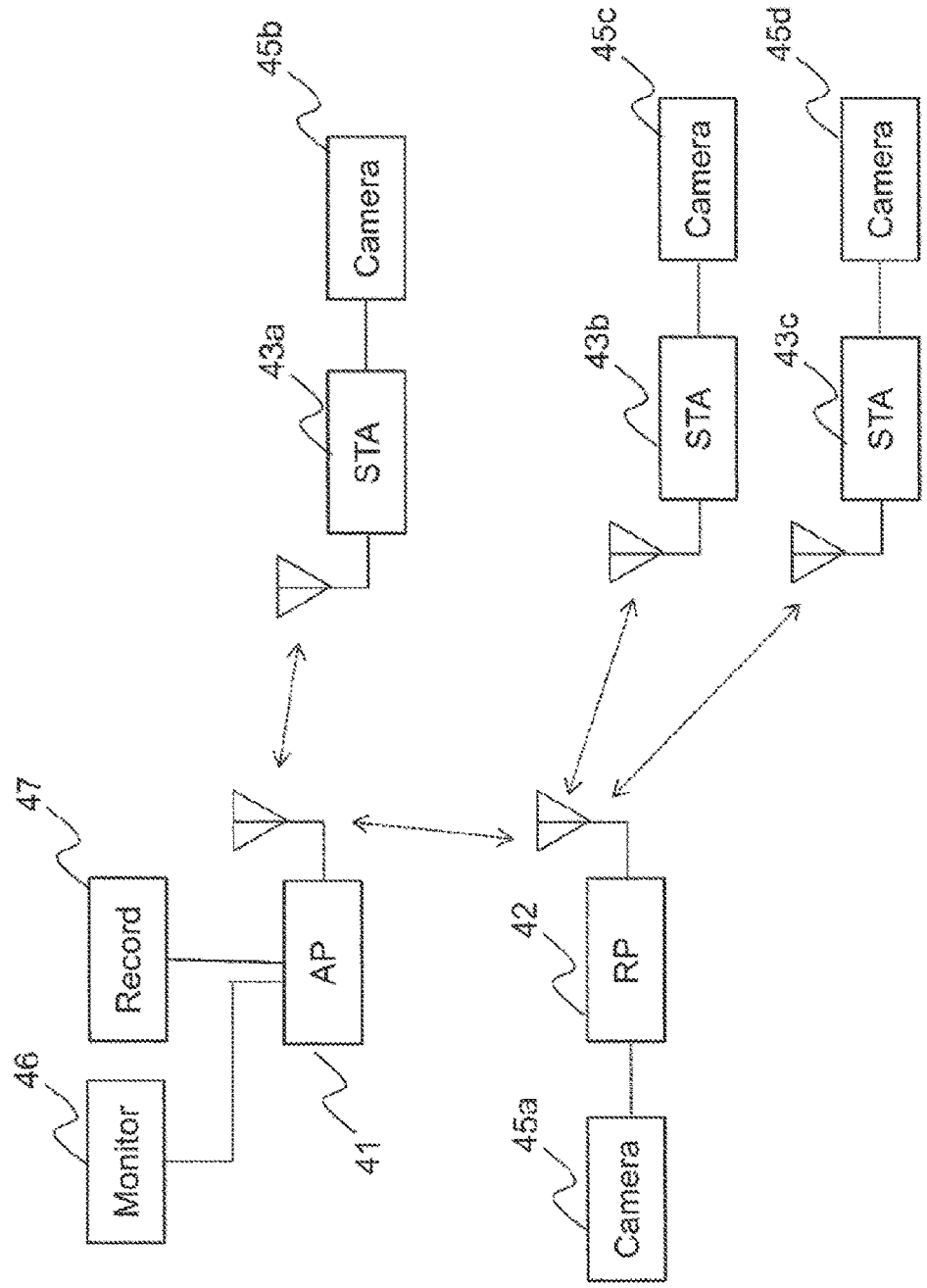
Fig. 20 WIRELESS SURVEILLANCE CAMERA SYSTEM WHICH IS APPLIED EMBODIMENT 1 OF PRESENT INVENTION

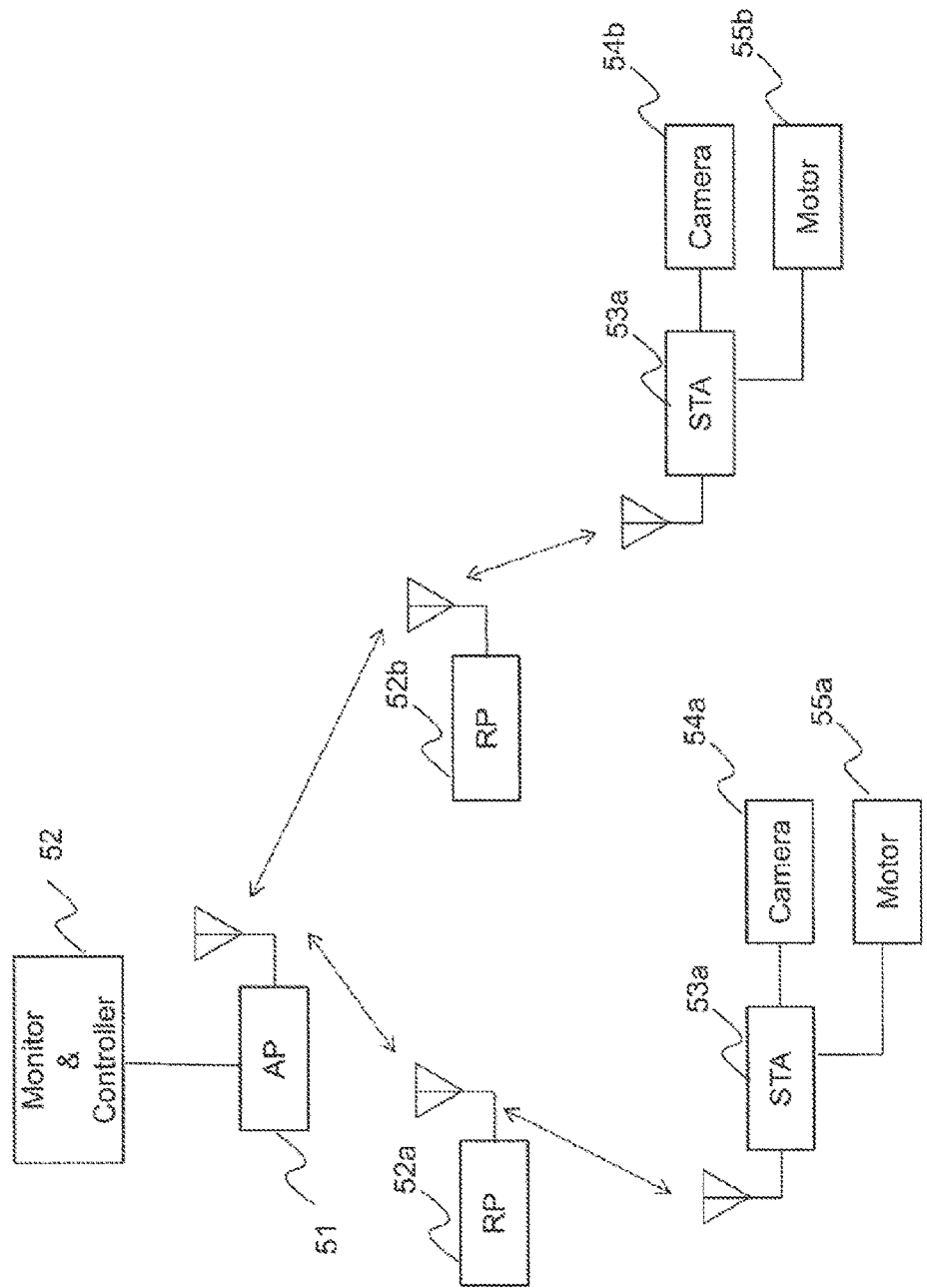

WIRELESS TRANSPORT SYSTEM

TECHNICAL FIELD

The present invention relates to a wireless transmission system, is particularly targeted at wireless communication, and relates to a multihop wireless communication system in more detail.

BACKGROUND ART

PTL 1 discloses, as a wireless LAN system having a QoS function, for example, a system using extended MAC (Media Access Control) of IEEE802.11e.

In conventional MAC of IEEE802.11 standard, two functions, i.e., DCF (Distributed Coordination Access) and PCF (Point Coordination Channel Access) are defined. In the extended MAC of IEEE802.11e, EDCA (Enhanced Distributed Channel Access) having a QoS (Quality of Service) characteristic, which is obtained by extending the DCF, and HCCA (Hybrid coordinated function Controlled Channel Access) which is obtained by extending the PCF are defined. The DCF and the EDCA are methods based on CSMA (Carrier Sense Multiple Access) and provide contention access means to a terminal. The PCF and the HCCA are access methods using a polling method and provide contention-free access means to a terminal. IEEE802.11e written standards disclose a reference scheduling method using the HCCA.

As a wireless access method extended in a multihop manner, other than the above method using the EDCA, a method of obtaining QoS with the use of polling is disclosed in PTL 2 and PTL 3.

CITATION LIST

Patent Literatures

PTL 1: JP-A-2010-178347
PTL 2: JP-A-2002-325273
PTL 3: JP-A-2010-226324

SUMMARY OF INVENTION

Technical Problem

It is problematic in that, in a case where multihop communication is constructed with the use of the EDCA and the number of terminals having the same priority are increased, collision is increased and communication efficiency is reduced. Further, a hidden terminal is easily generated because of a characteristic of the multihop, and, in that case, the communication efficiency is reduced.

Meanwhile, in a case where polling control is used, the above problems are solved by centralized control of a base station. However, in a case where polling control is applied to multihop communication, how to realize centralized control is a problem. PTL 2 discloses a method of changing a frequency channel in each hop, which can simultaneously perform communication with an upper wireless station and communication with a lower wireless station by using polling control.

In this method, it is problematic in that a plurality of frequency channels are needed and a hardware configuration of a transmitter-receiver is complicated.

Meanwhile, PTL 3 discloses a method of passing a polling authority to a lower relay station like a bucket brigade. In this method, in a case where, by any chance, a communication error occurs in a polling packet, polling cannot be performed on the following lower relay stations and terminals. Thus, disappearance of the polling packet influences an entire system, and therefore it is difficult to obtain robustness.

In view of the above problems, the invention provides a polling-based multihop communication system which constructs multihop with the use of the same frequency channel in order to simplify hardware and save frequency channels, thereby realizing robust communication.

Solution to Problem

First means for solving the above problems includes a base station, a plurality of relay stations, and a plurality of terminals as wireless stations, the terminals and the relay stations being wirelessly connected to the base station or the relay stations at multiple stages, in which: the base station and the relay stations are synchronized, and a system cycle of the base station and a system cycle of the relay stations are the same in terms of time; one or more service periods are allocated in time division to the base station and the relay stations in the single system synchronization; the base station or each of the relay stations performs polling communication with the terminal registered in own station with the use of polling in the single service period; and, in the polling communication, the base station or the relay station transmits a polling packet to the terminal registered in the own station, and the base station or the relay station receives a reply signal from the terminal registered in the own station.

Further, the base station transfers a synchronization packet to a first relay station which is in a layer lower than a layer of the base station, the first relay station which has received the synchronization packet transfers the synchronization packet to a second relay station which is in a layer lower than a layer of the first relay station, and the base station and the first and second relay stations determine the service periods allocated based on transmission timings of the synchronization packet.

Further, the service period is managed by at least three parameters, i.e., a start time of the service period, a stop time of the service period, and an entire system cycle on the basis of the transmission timing of the synchronization packet.

Further, the service period has a polling period and a CSMA period, in the polling period in which the polling communication is performed, the base station or the relay station to which the service period is allocated is wirelessly connected, and polling is performed on the terminal which needs QoS communication, and, in the CSMA period, the polling communication is not performed or another communication is performed.

Moreover, the polling period has a exhaustive polling period in which the polling is performed on all the terminals wirelessly connected to the base station or the relay station, and a selective polling period in which the polling is performed until data is successfully transmitted from the base station or the relay station to the terminal to which the data has been unsuccessfully transmitted in a period of the exhaustive polling period.

Moreover, two or more of the service periods are allocated to the same base station or the same relay station in the system cycle, and a first service period has a exhaustive polling period and a second service period has at least a selective polling period.

Moreover, the relay stations include a first relay station in a first layer and a second relay station in a second layer which is lower than the first layer, and the service periods are sequentially allocated to the second relay station, the first relay station, and the base station in this order from the head of the system cycle in terms of time.

Moreover, the base station and the relay stations cause the synchronization packet to have information on a synchronization reference point, and the second relay station which receives the synchronization packet holds a counter difference between internal clocks of the second relay station and the base station or the first relay station and obtains an accurate time of the reference point on the basis of the information on the reference point and the counter difference between the internal clocks.

Moreover, the base station and the relay station to which the service periods are allocated transmit an end notification packet when the service period ends, and cause the end notification packet to have transmission prohibition time information based on a polling period length of the polling communication of the base station or the relay station to which the next service period is allocated.

Moreover, the relay station holds a table having routing information, receives an association request in the relay station from a terminal which is not connected to the relay station and adds information on the terminal to information on the terminals in the routing table, wirelessly transfers change information of the routing table to the base station which is in a layer upper than a layer of the relay station or another relay station which is in a layer upper than the layer of the relay station, and receives a bandwidth request from the terminal and wirelessly transferring the bandwidth request to the base station which is in the layer upper than a layer of the terminal or the relay station which is in the layer upper than the layer of the terminal.

Furthermore, the relay station receives the routing table change information from a relay station which is in a layer lower than the layer of the relay station and updates the routing table on the basis of the change information, and receives the bandwidth request transferred from the relay station which is in the lower layer and transfers bandwidth request information to the base station which is in the layer upper than the layer of the relay station which is in the lower layer or the relay station which is in the layer upper than the layer of the relay station which is in the lower layer.

Furthermore, the base station receives the change information on the routing table from the relay station which is in the lower layer and updates the routing table on the basis of the change information, and the base station receives the bandwidth request transferred from the relay station which is in the lower layer, calculates a resource in response to the request, and, on the basis of a result of the calculation, transmits, to the relay station which is in the lower layer, a packet having request permission information or request non-permission information and service period allocation change information.

Furthermore, the wireless transmission system detects disconnection of the connected terminal and updates the information on the terminal of the routing table in a case where the disconnection is confirmed, transfers the change information of the routing table to the base station or the relay station which is in the upper layer, and transfers the bandwidth request to the base station or the relay station which is in the upper layer.

Furthermore, the relay station receives the routing table change information from a relay station which is in a lower layer and updates the routing table on the basis of the change information, and the relay station receives the bandwidth request transferred from another relay station which is in a layer lower than the layer of the relay station, and the relay station transfers the bandwidth request to the base station which is in the layer upper than the layer of the relay station or another relay station which is in a layer upper than the layer of the relay station.

Furthermore, the base station receives the change information on the routing table from the relay station which is in the layer lower than the layer of the base station and updates the routing table on the basis of the change information, and the base station receives the bandwidth request transferred from the relay station which is in the lower layer, calculates a resource in response to the request, and, on the basis of a result of the calculation, transmits, to the relay station which is in the lower layer, a packet having request permission and service period allocation change information.

Advantageous Effects of Invention

According to the invention, it is possible to provide a wireless transmission system which can achieve predetermined bandwidth and low delay communication in multihop transmission and is also robust in terms of interference.

Further, because multihop can be constructed with the use of the same frequency channel, it is possible to simplify hardware and save frequency resource.

BRIEF DESCRIPTION OF DRAWINGS

FIG. 1 shows a network configuration example in Example 1.

FIG. 2 shows a polling operation example in a service period.

FIG. 3 is a time chart showing a first polling timing example in Example 1.

FIG. 4 is a time chart showing a second polling timing example in Example 1.

FIG. 5 is a time chart showing a third polling timing example in Example 1.

FIG. 6 is a time chart showing a fourth polling timing example in Example 1.

FIG. 7 is a timing chart showing an operation example of a base station in the first polling timing example in Example 1.

FIG. 8 is a timing chart showing an operation example of a relay station in the first polling timing example in Example 1.

FIG. 9A is a chart showing operation of a base station and relay stations in Example 1.

FIG. 9B is a flowchart showing operation of a base station in Example 1.

FIG. 10 is a flowchart showing operation of a relay station in Example 1.

FIG. 11 is a block diagram showing a configuration example of a base station in Example 1.

FIG. 12 is a time chart showing a fifth polling timing example in Example 1.

FIG. 13 is a time chart showing how to deal with a case where transmission of a synchronization packet is delayed when interference exists.

FIG. 14 shows a countermeasure for interference using prohibition of transmission.

FIG. 15 is a block diagram showing a configuration example of a base station in Embodiment 2.

FIG. 16 is a time sequence example performed at the time of addition/disconnection of a. terminal.

FIG. 17 is a flowchart showing an operation example performed at the time of addition of a terminal.

FIG. 18 is a flowchart showing an operation example performed at the time of removal of a terminal from a network.

FIG. 19 shows simulation results indicating delay characteristics.

FIG. 20 shows a ireless surveillance camera system which is Applied Embodiment 1 of the invention.

FIG. 21 shows a remote control system which is Applied Embodiment 2 of the invention.

DESCRIPTION OF EMBODIMENTS

Hereinafter, the invention will be specifically described with reference to drawings showing embodiments (examples) thereof.

Example 1

(1) Network Configuration

FIG. 1 is a schematic view showing a network configuration example of a wireless transmission system according to Example 1.

As shown in FIG. 1, a network includes a base station (AP) 01, one or more relay stations, and one or more terminals (devices) (STA) 04a to 04e. The base station, the relay stations, and the terminals are wireless stations which perform wireless communication. As shown in FIG. 1, this example will be described by exemplifying the network including the three relay stations and the plurality of terminals connected thereto.

The relay stations form a multistage structure using the base station as a root, and, in the example shown in FIG. 1, a relay station a (RPa) 02a and a relay station b (RPb) 02b are relay stations connected to the base station, and a relay station a-a (RPa-a) 03a and a relay station a-b (RPa-b) 03b are relay stations connected to the relay station a 02a. For example, data transmitted from a terminal 04a is transmitted to the base station 01 via the relay station a-a 03a and the relay station a 02a. In order to transmit data to the terminal 04a from the base station 01, the data is transmitted via the relay station a 02a and the relay station a-a 03a.

(2) Service Period in Polling Control

The base station and the relay stations are connected with one another and polling control is performed on a wireless station which requests QoS communication (hereinafter, Qos wireless station). The polling control is performed in each time period called service period (SI: Service Interval).

FIG. 2 shows a polling operation example in the service period.

The base station or the relay station transmits a polling packet, QoS wireless stations (terminal 1, terminal 2) connected thereto are allowed to transmit data only in a case where the QoS wireless stations receive polling packets for own stations.

The service period is divided into a polling period and a CSMA period. In the polling period, the base station or the relay station repeatedly transmits a polling packet, receives data, or, in some cases, performs operation for transmitting ACK. In the CSMA period, a polling packet is not transmitted.

In some cases, a CSMA End packet to notify end of the CSMA period to another wireless station is transmitted as necessary.

In the example of FIG. 2, the polling period is divided into a exhaustive polling period and a selective polling period. In the exhaustive polling period, the base station or the relay station transmits polling packets to all connected QoS wireless stations. In the selective polling period, a polling packet is transmitted to a QoS wireless station to which data has been unsuccessfully transmitted in the exhaustive polling period, and the polling packet is transmitted until the data is successfully transmitted.

By this control, it is possible to realize transmission with a deterministic delay even in a case where error occurs in communication.

(3) Polling Timing in Multihop

In this embodiment, in order to perform polling operation in a plurality of base stations and relay stations, a service period in which the base stations and the relay stations can perform polling is divided in time and the divided service periods are allocated to the base stations and the relay stations, respectively, in a cycle of a system (system cycle).

FIG. 3 is a (first) time chart thereof.

In order to simplify the description herein, the description will be made assuming that a network has a multihop configuration in order of a base station, a relay station 1, and a relay station 2, instead of using the network configuration of FIG. 1 (Even in a case where the description herein is applied to the network of FIG. 1, such application does not deviate from the scope of the invention described herein.).

In FIG. 3, the service periods are allocated in descending order of a multihop network including the relay station 2, the relay station 1, and the base station, i.e., are allocated to the relay station 2, the relay station 1, and the base station in this order.

As described above, each of the service periods has a polling period and a CSMA period. In order to allocate the service periods in time division, the base station, the relay station 1, and the relay station 2 need to be synchronized. This synchronization is performed by transmitting a synchronization packet to the relay station 1 from the base station and transmitting a synchronization packet to the relay station 2 from the relay station 1.

That is, the service periods are determined by using transmission/reception timings of the synchronization packets as reference time bases.

FIG. 4 shows a second polling timing example and is different from a first timing example in that a polling period has a exhaustive polling period and a selective polling period.

Regarding allocation timings of the exhaustive polling period, the selective polling period, and a CSMA period, various methods are employed. For example, in the first and the second timing examples, the allocated service period is one continuous period. It is also possible to divide the service period into the above periods and separately allocate the periods.

FIG. 5 is a third timing example showing an example of the above case. In FIG. 5, exhaustive polling periods are allocated to the relay station 2, the relay station 1, and the base station in this order and then selective polling periods and CSMA periods are continuously allocated in this order. This timing example is an example where an end notification (CSMA End) packet is transmitted when each CSMA period ends.

FIG. 6 shows a fourth timing example. In this example, polling periods, each of which has a exhaustive polling period and a selective polling period, are allocated to the relay station 2, the relay station 1, and the base station in this order and then CSMA periods are allocated as a whole.

In this example, a length of each selective polling period is changed depending on a communication situation, and therefore a polling period end notification packet is transmitted at the end of the period.

(4) Timing Control in Base Station and Relay Station

FIG. 7 shows a timing control example in the base station 01 in the network configuration in FIG. 1 and a first polling timing control example in FIG. 3.

The timing control is performed with the use of at least three cycle/times, i.e., a system cycle (SI system), a service period start time (SI start), and a service period stop time (SI stop).

In FIG. 7, synchronization packets are transmitted to connected lower-layer relay stations (relay station a 02a, relay station b 02b) at the head of the system cycle. In this embodiment, the base station 01 sequentially transmits the synchronization packets to the lower-layer relay stations in each system cycle. Based on transmission timings of the synchronization packets, start of the service periods of own stations (=polling start times) and end times of the service periods are managed.

FIG. 8 similarly shows timing control of the relay station.

FIG. 8 shows a control example of the relay station a 02a in the network configuration of FIG. 1. The head of a system cycle is determined based on a synchronization timing transmitted from the base station 01, and control is performed in a service period.

In a case where the relay station a 02a receives a synchronization packet transmitted to own station, the relay station a 02a transmits the synchronization packet to a relay station (relay station a-a 03a or relay station a-b 03b) which is in a layer lower than a layer of the own station.

In this example, in a case of reception of a synchronization packet, only one synchronization packet is transmitted and is sequentially transmitted to the lower-layer relay stations. After the synchronization packet is received to determine the head of the system cycle, start of the service period of own station (=polling start time) and an end time of the service period are managed in the same way as the control in the base station 01.

An operation example in the base station 01 and the relay stations 02, 03 will be described with reference to flowcharts of FIG. 9(*a*), FIG. 9(*b*), and FIG. 10.

FIG. 9(*a*) is a chart showing operation in the base station and the relay stations. Initialization is performed, an idle state is entered, and various kinds of interruption are waited. After occurrence of the interruption, processes are performed according to factors of the respective kinds of interruption. The respective kinds of interruption processes will be described with reference to FIG. 9(*b*) and FIG. 10.

FIG. 9(*a*) shows an operation example performed at the time of inputting a timer for managing a system cycle in the base station. In a case where no lower-layer relay station exists after the system cycle timer is inputted, a network is not a multihop network, and polling control having a service period is started as shown in the example of FIG. 2. In a case where lower-layer relay stations exist, a synchronization packet is transmitted to at least one of the relay stations and a service period start timer is set.

FIG. 9(*b*) shows an operation example performed at the time of inputting the service period start timer. After the service period start timer is inputted, a service period stop timer is set, and polling control having a service period is started as shown in the example of FIG. 2.

FIG. 10(*a*) shows an operation example at the time of receiving a synchronization packet in the relay station. In a case where a synchronization packet for own station is received, an accurate reference time is calculated based on a reception timing thereof, thereby determining a start time of a system cycle. In a case where the reception timing is later than a start time of a service period allocated to own station, a synchronization packet is not transferred. Because polling communication is started when the start time is started, the synchronization packet interferes.

In a case other than the above case and in a case where lower-layer relay stations exist, the synchronization packet is transmitted to at least one relay station. In a case where no lower-layer relay station exists or after the synchronization packet is transmitted, the service period start timer is set. In a case where the system cycle timer is set, the system cycle timer is cancelled.

FIG. 10(*b*) shows operation after the service period start timer is inputted or the system cycle timer is inputted, and, in a case where the service period stop timer and the system cycle timer are not set after either the timers are inputted, the system cycle timer is set.

Herein, in a case where a synchronization packet cannot be received during a time (x second(s)) which has been set in advance, the system cycle timer may be cancelled so that the service period is not started. Thereafter, polling control having a service period is started as shown in the example of FIG. 2.

(5) Base Station/Relay Station Configuration Example

FIG. 11 shows a configuration example of a base station and a relay station which can achieve the control described above.

The base station or the relay station includes an application unit (Application) 11, a protocol processing unit (Protocol) 12, a reception processing unit (RX) 13, a timing control unit (Timing Controller) 14, a scheduling control unit (Scheduling Controller) 15, a data selection unit (Select) 16, a CSMA queue (Queue for CSMA) 17, a polling access queue (Queue for PA) 18, a piggyback queue (Queue for PB) 19, a CSMA unit (CSMA) 20, a polling access unit (Polling Access) 21, a piggyback access unit (Piggyback Access) 22, a polling unit (Polling) 23, and a physical layer (PHY(TX/RX)) 24.

The invention is not limited by realization means thereof such as a processor, an FPGA, and an ASIC. That is, those functions may be realized as software of the processor or may be realized by exclusive hardware as the ASIC.

In a case where a data transmission request is generated from the application unit 11, a process based on communication specifications is performed in the protocol processing unit 12.

For example, a process defined in IEEE802.11 is performed.

Thereafter, the selection unit 16 determines a type of data and determines which queue is used. As an example, in a case of data which does not request QoS, the data is transmitted to the CSMA queue 17 because the data is transmitted with the use of usual CSMA. In a case where data which needs the QoS is transmitted to an upper-layer wireless station, the data is transmitted to the polling access queue 18. Further, in a case where data which needs the QoS is transmitted to a lower-layer wireless station, the data is transmitted to the piggyback queue 19.

In polling access, the data is transmitted by polling control of the upper-layer wireless station, and, in piggyback access, a polling packet having the data is transmitted to the lower-layer wireless station. The polling access unit 21 and the piggyback access unit 22 perform the above processes, respectively.

The timing control unit 14 performs the timing control described above and controls a system cycle, a service period start time, and a stop time in this example. The timing control unit 14 also controls a transmission time of a synchronization packet.

The scheduling control unit 15 controls scheduling in a service period. A polling packet is generated and is transmitted by the polling unit 23.

All packets are converted by the physical layer 24 into actual wireless signals and are transmitted to a space.

(6) Delay Guarantee of Downstream Communication

FIG. 12 shows a fifth polling timing example in this example. Allocation of the service periods is the same as that of FIG. 3, but, after the service periods, periods exclusive to downstream communication are provided.

As shown in FIG. 12, upstream/downstream communication can be performed once in a system cycle by allocating the service periods from the lower-layer relay station in upstream communication and allocating the service periods from the upper-layer base station/relay station in downstream communication.

(7) Determination of Reference Time Based on Synchronization Packet

The head of a system cycle is determined based on a synchronization packet. However, a signal from another system may exist as interference and an error may occur in communication, and therefore the head of the system cycle cannot be determined only based on a reception time of the synchronization packet.

FIG. 13 shows an example of a method of determining the head of the system cycle. The base station and the relay stations hold counters for measuring a time and periodically measure differences between counter values of the base station and the relay stations. Although a measurement method is not particularly limited, for example, in a case where IEEE802.11 is used, beacon signals are periodically transmitted, and therefore the measurement can be performed by transmission and reception of the beacon signals.

In fact, in a case where the above differences between the counter values are measured with the use of the beacon signals, synchronization is established by notifying the head of the system cycle and an allocation time of each service period, and therefore control in time division can be achieved.

In this case, it can be considered that a beacon signal is used as a synchronization packet. However, a format of a beacon signal of IEEE802.11 cannot be changed, and therefore a controlling method using a new synchronization packet is described in this example.

The base station transmits a synchronization packet including a counter value of a start time (synchronization point) of a system cycle. The relay station which has received the synchronization packet can obtain a counter value of the synchronization point on the basis of the difference between the counter values measured in advance and the counter value included in the synchronization packet. The relay station causes the synchronization packet to include the counter value of the calculated synchronization point again and transmits the synchronization packet.

In the above processes, an accurate synchronization point can be obtained even in a case where the reception time of the synchronization packet is delayed due to influence of an interference signal.

(8) Control using Prohibition of Transmission

By using a mechanism called NAV (Network Allocation Vector), IEEE802.11 provides a virtual carrier sense function and can achieve control of transmission of multiple access. This mechanism is such that all wireless stations can refer to period information included in a packet and prohibition of transmission is set to the NAV in the period.

FIG. 14 shows an example of a method of protecting data communication during polling control by using this mechanism.

In FIG. 14, a synchronization packet has, as period information, a time corresponding to a polling period of a subsequent service period, and, in a wireless station which has received the period information, transmission is prohibited in the period, and therefore the polling period is protected.

When the service period ends, an end notification packet having, as period information, a time corresponding to a polling period of a subsequent service period is similarly transmitted.

Polling packets and reply packets thereof, each of which has period information having a time of a polling period, are similarly transmitted.

In those packets, in a case where a polling period is extended in a selective polling period or the like, such extension is also included. In FIG. 14, in a case where a wireless station positioned in a range in which the wireless station cannot receive a wireless signal from the relay station 2 but can receive a wireless signal from the relay station 1 is protected, the extension of the polling period cannot be notified by using a polling packet. Therefore, by intentionally transmitting a polling packet to the relay station 1 which is an upper-layer relay station and including the extended period in a reply packet thereof, it is possible to protect a polling period corresponding to the extension.

(9) Admission Control

In order to perform polling control, it is necessary to register a terminal and allocate a resource in advance.

It is also necessary to perform routing control in multihop.

Examples which realize the above registration, allocation, and control will be described with reference to FIG. 15 to FIG. 18.

FIG. 15 shows a configuration example of a base station/relay station having functions of registering a terminal, allocating a resource of polling, and performing routing control.

As compared with the configuration of FIG. 11, an association/authentication unit (Association (Authentication)) 31, routing control (Routing Control) 32, a resource control unit (Resource Control) 33, and a setting I/F (Configuration IF) 34 are added.

FIG. 16 shows a flow example performed at the time of adding/removing a terminal to/from a network realized in FIG. 15. FIG. 17 shows a flowchart of an operation example performed in a terminal (a), a relay station (b), and a base station (c) at the time of adding a terminal. FIG. 18 shows a flowchart of an operation example performed in the terminal (a), the relay station (b), and the base station (c) at the time of removing a terminal.

At the time of adding the terminal, the terminal is booted and a wireless station therearound is searched, an appropriate base station or relay station is authenticated as necessary, and an association request is transmitted thereto.

For example, a method of selecting a base station or relay station having a highest RSSI is employed. In a case where permission of association is received after an association request is transmitted, a bandwidth request for participation in polling control is transmitted. The bandwidth request has, for example, a necessary bandwidth and an allowable delay amount as information. Thereafter, in a case where permission of the bandwidth request is received, communication is started.

The relay station which has received the association request replies association permission. Thereafter, the relay station updates a routing table in which an IP address and a MAC address are associated with each other and transmits the information to an upper-layer relay station or the base station.

In a case where the bandwidth request is received from the terminal, the bandwidth request is transferred to the upper-layer relay station or the base station, reception of bandwidth permission or rejection is waited, and a bandwidth permission or rejection notification is transferred to the terminal. In a case where the bandwidth permission is received, setting information having timing information of a service period is simultaneously transmitted. Therefore, the setting information is reflected in a parameter of the service period.

The base station or the relay station which has received routing information updates a routing table on the basis of the information.

The base station which has received the bandwidth request calculates a resource and determines whether or not the bandwidth permission is allowed. In a case where the bandwidth permission is not allowed, the bandwidth rejection notification is transmitted, whereas, in a case where the bandwidth permission is allowed, the bandwidth permission notification is transmitted together with setting information having new resource period information.

This setting information is transmitted to all the relay stations. Therefore, the relay stations which have received the setting information need to transfer the setting information to lower-layer relay stations. Thereafter, in the base station, a change is reflected in the parameter of the service period.

In a case where the terminal is removed from the network, a connected relay station or base station detects this removal.

The relay station which has detected removal of the connected terminal updates the routing table in which the IP address and the MAC address are associated with each other and transmits information thereon to the upper-layer relay station or the base station.

The relay station transmits a bandwidth change request to the base station and receives a bandwidth change permission notification and setting information. The relay station changes the parameter of the service period in accordance with the received setting information.

The base station or the relay station which has received routing information updates the routing table on the basis of the information.

The base station which has received the bandwidth change request calculates a resource and transmits a bandwidth permission notification together with setting information having new resource period information.

This setting information is transmitted to all the relay stations. Therefore, the relay stations which have received the setting information need to transfer the setting information to the lower-layer relay stations. Thereafter, the change is reflected in the parameter of the service period.

In the above configuration, the base station collectively controls wireless communication among the base station, the relay stations, and terminals included in the system. In particular, routing control, resource control, and communication timing control regarding wireless communication are managed and are collectively controlled in the base station.

In the above description, embodiments of the invention have been described, but the scope of the invention is not limited to those embodiments.

By the invention, it is possible to provide a wireless transmission system which can achieve predetermined bandwidth and low delay communication in wireless multihop transmission and is also robust in terms of interference.

Further, because multihop can be constructed with the use of the same frequency channel, it is possible to simplify hardware and save frequency resource.

FIG. 19 shows simulation results of delay characteristics obtained in a case where multihop is realized by a conventional CSMA method and obtained in a case where multihop is realized by the presented method.

Simulation is performed in a case where the physical layer uses 54 Mbps of IEEE802.11a standard in data packet, 12 Mbps is used for a polling packet, data is 3 Mbps, the number of terminals are two, and the number of hops are three. With this, the presented method has an excellent delay characteristic.

Finally, an applied embodiment of the wireless system in the invention will be described.

FIG. 20 is a view in which the wireless system in the invention is applied to a surveillance camera system. A base station (AP) 41, a relay station (RP) 42, and terminals (STA) 43 are realized by the wireless stations in the invention.

Cameras (Cameras) 45 are connected to the terminals 43, respectively, and images of the cameras are wirelessly transmitted via the respective terminals 43.

Each of the terminals 43 is connected to the base station 41 or the relay station 42, transmission is performed by polling access controlled by the base station 41 or the relay station 42. The relay station 42 transmits received image data to the base station 41 by polling access.

The cameras 45 may be connected to the relay station 42 or the base station.

In the example of FIG. 20, a camera 45a is connected to the relay station 42. A monitor (Monitor) 46 and a storage device (Record) 47 are connected to a base station 31, and display and recording are performed. According to the applied embodiment, it is possible to provide a wireless surveillance camera system which can transmit image data of cameras with a low delay having a predetermined value or less in a wide area.

FIG. 21 is a view in which a wireless system in the invention is applied to a remote control system such as a construction machine or a robot.

Abase station (AP) 51, relay stations (RP) 52, terminals (STA) 53 are realized by wireless stations in the invention.

Cameras (Cameras) 54 and power units (Motor) 55 are connected to the terminals 53, respectively. The terminals 53 are wirelessly connected to one of the base station 51 and the relay station 52 and transmit images thereto from the cameras 54. The relay station 52 transmits received image data to the base station 51.

A display & control unit (Monitor & Controller) is connected to the base station 51, and an operator operates while watching the images transmitted from the cameras 54.

Control signals are generated by the operation of the operator and are transmitted to the terminals 53 via the base station 51 and the relay stations 52. The terminals 53 control the power units 55 in response to the received control signals.

Therefore, by transmitting an image signal and a control signal with a predetermined or less delay, it is possible to provide a robust and smooth remote control system.

REFERENCE SIGNS LIST

01, 41, 51 base station (AP)
02, 03, 42, 52 relay station (RP)
04, 43, 53 terminal (STA)
11 application unit (Application)
12 protocol processing unit (Protocol)

13 reception processing unit (RX)
14 timing control unit (Timing Controller)
15 scheduling control unit (Scheduling Controller)
16 selection unit (Select)
17 CSMA queue (Queue for CSMA)
18 polling access queue (Queue for PA)
19 piggyback queue (Queue for PB)
20 CSMA unit (CSMA)
21 polling access unit (Polling Access)
22 piggyback access unit (Piggyback Access)
23 polling unit (Polling)
24 physical layer (PHY (TX/RX))
31 association/authentication unit (Association (Authentication))
32 routing control unit (Routing Control)
33 resource control unit (Resource Control)
34 setting I/F (Configuration IF)
44, 54 camera (Camera)
46 monitor (Monitor)
47 storage unit (Record)
52 monitor & control unit (Monitor & Controller)

The invention claimed is:

1. A wireless transmission system, comprising:
a base station,
a plurality of relay stations, and
a plurality of terminals as wireless stations, the terminals and the relay stations being wirelessly connected to the base station or the relay stations at multiple stages, wherein:
the base station and the relay stations are synchronized, and a system cycle of the base station and a system cycle of the relay stations are the same in terms of time;
one or more service periods are allocated in time division to the base station and the relay stations in the single system cycle;
the base station or each of the relay stations includes means for performing polling communication with the terminal registered in own station with the use of polling in the single service period;
in the polling communication, the base station or the relay station transmits a polling packet to the terminal registered in the own station, and the base station or the relay station includes means for receiving a reply signal from the terminal registered in the own station; and
the base station and the relay station to which the service periods are allocated include
means for transmitting an end notification packet when the service period ends, and
means for causing the end notification packet to have transmission prohibition time information based on a polling period length of the polling communication of the base station or the relay station to which the next service period is allocated.

2. The wireless transmission system according to claim 1, wherein:
the base station includes means for transferring a synchronization packet to a first relay station which is in a layer lower than a layer of the base station;
the first relay station which has received the synchronization packet includes means for transferring the synchronization packet to a second relay station which is in a layer lower than a layer of the first relay station; and
the base station and the first and second relay stations include means for determining the service periods allocated based on transmission timings of the synchronization packet.

3. A wireless transmission system comprising:
a base station;
a plurality of relay stations; and
a plurality of terminals as wireless stations, the terminals and the relay stations being wirelessly connected to the base station or the relay stations at multiple stages, wherein:
the base station and the relay stations are synchronized, and a system cycle of the base station and a system cycle of the relay stations are the same in terms of time;
one or more service periods are allocated in time division to the base station and the relay stations in the single system cycle;
the base station or each of the relay stations includes means for performing polling communication with the terminal registered in own station with the use of polling in the single service period;
in the polling communication, the base station or the relay station transmits a polling packet to the terminal registered in the own station, and the base station or the relay station includes means for receiving a reply signal from the terminal registered in the own station;
the base station includes means for transferring a synchronization packet to a first relay station which is in a layer lower than a layer of the base station;
the first relay station which has received the synchronization packet includes means for transferring the synchronization packet to a second relay station which is in a layer lower than a layer of the first relay station;
the base station and the first and second relay stations include means for determining the service periods allocated based on transmission timings of the synchronization packet and
the service period is managed by at least three parameters, including a start time of the service period, a stop time of the service period, and an entire system cycle on the basis of the transmission timing of the synchronization packet.

4. The wireless transmission system according to claim 1, wherein:
the service period has a polling period and a CSMA period;
in the polling period in which the polling communication is performed, the base station or the relay station to which the service period is allocated is wirelessly connected, and polling is performed on the terminal which needs QoS communication; and
in the CSMA period, the polling communication is not performed or another communication is performed.

5. A wireless transmission system comprising:
a base station;
a plurality of relay stations; and
a plurality of terminals as wireless stations, the terminals and the relay stations being wirelessly connected to the base station or the relay stations at multiple stages, wherein:
the base station and the relay stations are synchronized, and a system cycle of the base station and a system cycle of the relay stations are the same in terms of time;
one or more service periods are allocated in time division to the base station and the relay stations in the single system cycle;
the base station or each of the relay stations includes means for performing polling communication with the terminal registered in own station with the use of polling in the single service period;

in the polling communication, the base station or the relay station transmits a polling packet to the terminal registered in the own station, and the base station or the relay station includes means for receiving a reply signal from the terminal registered in the own station;

the service period has a polling period and a CSMA period;

in the polling period in which the polling communication is performed, the base station or the relay station to which the service period is allocated is wirelessly connected, and polling is performed on the terminal which needs QoS communication;

in the CSMA period, the polling communication is not performed or another communication is performed; and the polling period has
- an exhaustive polling period in which the polling is performed on all the terminals wirelessly connected to the base station or the relay station, and
- a selective polling period in which the polling is performed until data is successfully transmitted from the base station or the relay station to the terminal to which the data has been unsuccessfully transmitted in a period of the exhaustive polling period.

6. The wireless transmission system according to claim 1, wherein:

two or more of the service periods are allocated to the same base station or the same relay station in the system cycle; and a first service period has an exhaustive polling period and a second service period has at least a selective polling period.

7. The wireless transmission system according to claim 1, wherein:

the relay stations include a first relay station in a first layer and a second relay station in a second layer which is lower than the first layer; and the service periods are sequentially allocated to the second relay station, the first relay station, and the base station in this order from the head of the system cycle in terms of time.

8. The wireless transmission system according to claim 2, wherein:

the base station and the relay stations include means for causing the synchronization packet to have information on a synchronization reference point; and the second relay station which receives the synchronization packet includes means for holding a counter difference between internal clocks of the second relay station and the base station or the first relay station and obtaining an accurate time of the reference point on the basis of the information on the reference point and the counter difference between the internal clocks.

9. The wireless transmission system according to claim 1, wherein the relay station includes
means for holding a table having routing information,
means for receiving an association request in the relay station from a terminal which is not connected to the relay station and adding information on the terminal to information on the terminals in the routing table,
means for wirelessly transferring change information of the routing table to the base station which is in a layer upper than a layer of the relay station or another relay station which is in a layer upper than the layer of the relay station, and
means for receiving a bandwidth request from the terminal and wirelessly transferring the bandwidth request to the base station which is in the layer upper than a layer of the terminal or the relay station which is in the layer upper than the layer of the terminal.

10. The wireless transmission system according to claim 9, wherein the relay station includes
means for receiving the routing table change information from a relay station which is in a layer lower than the layer of the relay station and updating the routing table on the basis of the change information, and
means for receiving the bandwidth request transferred from the relay station which is in the lower layer and transferring bandwidth request information to the base station which is in the layer upper than the layer of the relay station which is in the lower layer or the relay station which is in the layer upper than the layer of the relay station which is in the lower layer.

11. The wireless transmission system according to claim 9, wherein:

the base station includes means for receiving the change information on the routing table from the relay station which is in the lower layer and updating the routing table on the basis of the change information; and the base station includes means for receiving the bandwidth request transferred from the relay station which is in the lower layer, calculating a resource in response to the request, and, on the basis of a result of the calculation, transmitting, to the relay station which is in the lower layer, a packet having request permission information or request non-permission information and service period allocation change information.

12. The wireless transmission system according to claim 9, comprising:

means for detecting disconnection of the connected terminal and updating the information on the terminal of the routing table in a case where the disconnection is confirmed;

means for transferring the change information of the routing table to the base station or the relay station which is in the upper layer; and means for transferring the bandwidth request to the base station or the relay station which is in the upper layer.

13. The wireless transmission system according to claim 12, wherein:

the relay station includes means for receiving the routing table change information from a relay station which is in a lower layer and updating the routing table on the basis of the change information; and the relay station receives the bandwidth request transferred from another relay station which is in a layer lower than the layer of the relay station, and the relay station includes means for transferring the bandwidth request to the base station which is in the layer upper than the layer of the relay station or another relay station which is in a layer upper than the layer of the relay station.

14. The wireless transmission system according to claim 13, wherein:

the base station includes means for receiving the change information on the routing table from the relay station which is in the layer lower than the layer of the base station and updating the routing table on the basis of the change information; and the base station includes means for receiving the bandwidth request transferred from the relay station which is in the lower layer, calculating a resource in response to the request, and, on the basis of a result of the calculation, transmitting, to the relay station which is in the lower layer, a packet having request permission and service period allocation change information.

15. The wireless transmission system according to claim 1, wherein
the base station collectively perform routing control, resource control, and communication timing control related to wireless communication among the base station, the plurality of relay stations, and the plurality of terminals.

* * * * *